No. 684,440.  
E. & E. J. LAVENS.  
SIGNAL TELEGRAPH.  
(Application filed Jan. 7, 1901.)  
Patented Oct. 15, 1901.

(No Model.)

3 Sheets—Sheet 1.

No. 684,440. Patented Oct. 15, 1901.
E. & E. J. LAVENS.
SIGNAL TELEGRAPH.
(Application filed Jan. 7, 1901.)
(No Model.) 3 Sheets—Sheet 2.

No. 684,440.  
E. & E. J. LAVENS.  
SIGNAL TELEGRAPH.  
(Application filed Jan. 7, 1901.)  
Patented Oct. 15, 1901.

(No Model.)  
3 Sheets—Sheet 3.

WITNESSES:  
J. E. Pearson  
J. A. Cavanagh

INVENTORS  
E. Lavens  
E. J. Lavens  
BY  
Geo. H. Benjamin  
ATTORNEY

UNITED STATES PATENT OFFICE.

ERWIN LAVENS AND EDWARD JOSEPH LAVENS, OF BROOKLYN, NEW YORK.

SIGNAL-TELEGRAPH.

SPECIFICATION forming part of Letters Patent No. 684,440, dated October 15, 1901.

Application filed January 7, 1901. Serial No. 42,447. (No model.)

*To all whom it may concern:*

Be it known that we, ERWIN LAVENS and EDWARD JOSEPH LAVENS, citizens of the United States, residing at the borough of Brooklyn, city of New York, county of Kings, State of New York, have invented certain new and useful Improvements in Signal-Telegraphs, of which the following is a specification.

Our improved signal-telegraph consists, essentially, of two identical instruments connected through suitable electrical conductors and each of said instruments adapted to transmit an order which will be visibly and audibly indicated by the opposite instrument. In other words, assuming one instrument to be located upon the bridge of a steamship and the other instrument in the engine-room, the order transmitted from the bridge instrument will be visibly and audibly indicated by the engine-room instrument, and the acknowledgment of this order transmitted from the engine-room instrument will be visibly and audibly indicated by the bridge instrument, the object of this arrangement being for the purpose of permitting an officer on the bridge to transmit an order and then be informed that his order has been received and executed.

The accompanying drawings will serve to illustrate our invention.

Figure 1:
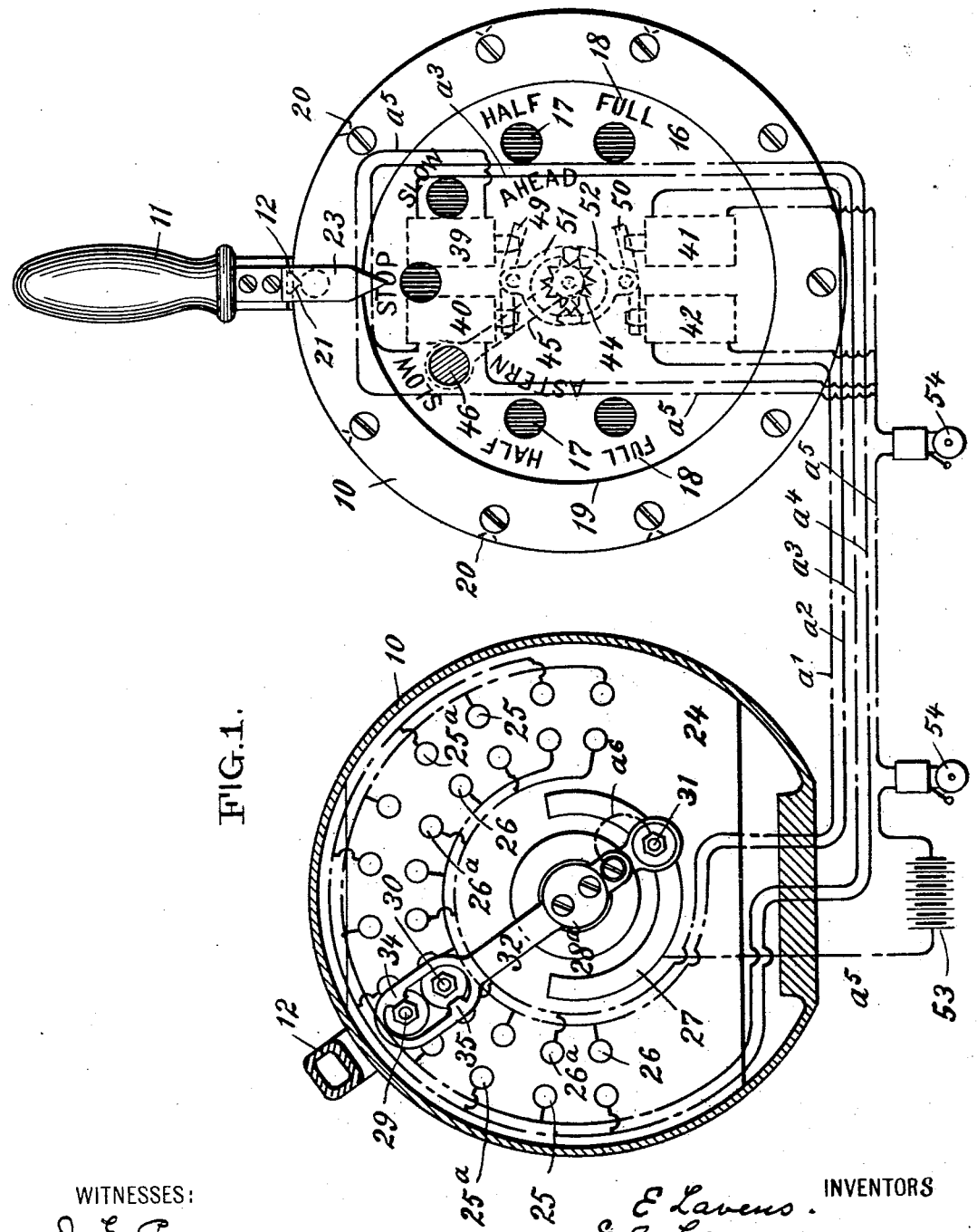
Figure 2:
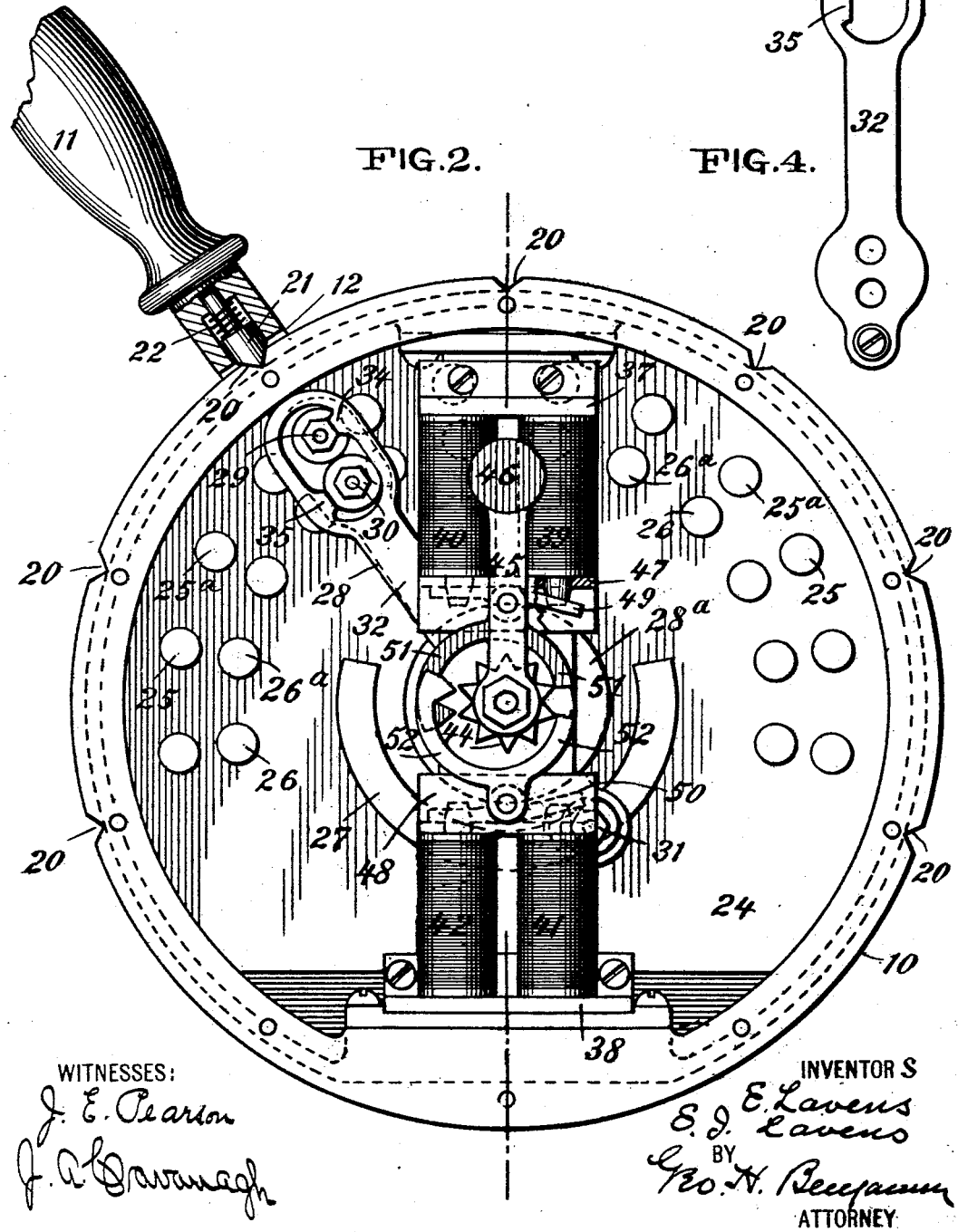
Figure 3:
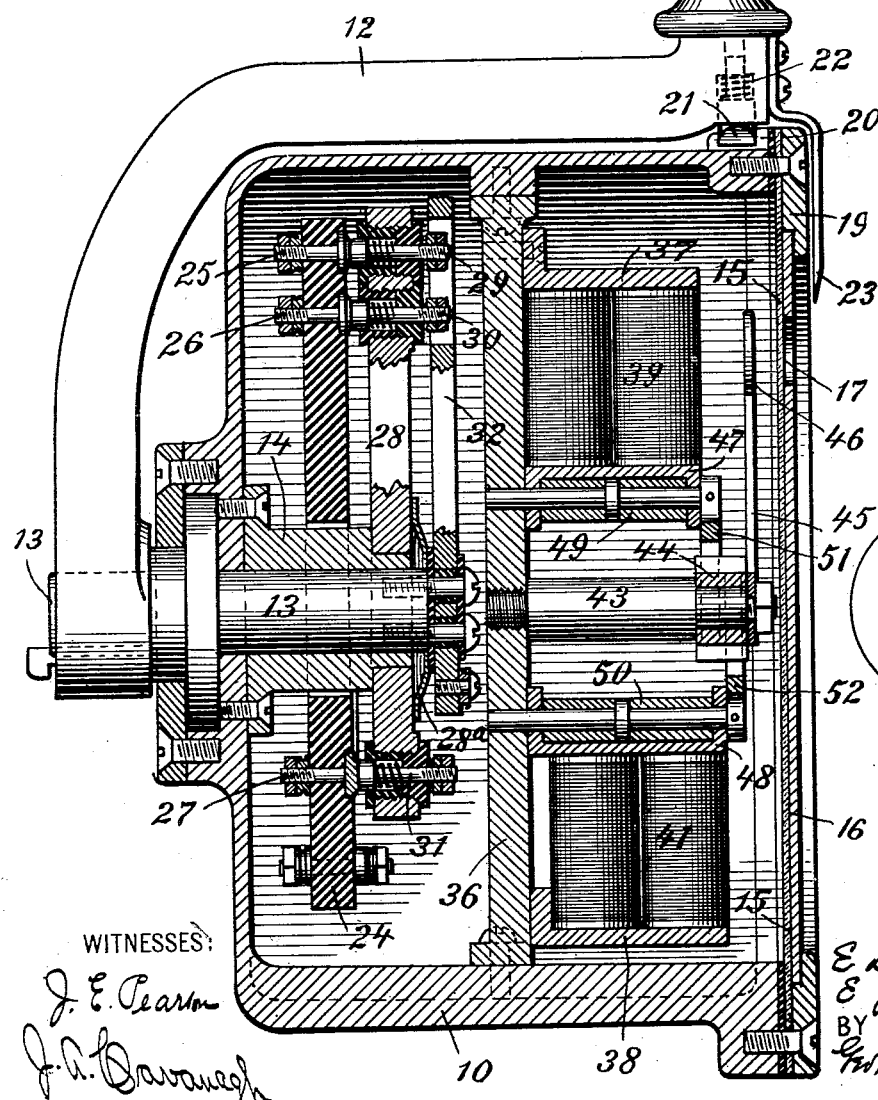
Figure 5:
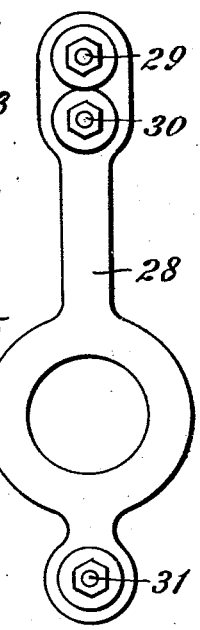

Figure 1 is a diagrammatic view showing two instruments in circuit. The circuit connections shown for the sake of clearness illustrate but one set of conductors between the instruments. It will be understood that in practice duplicate sets of conductors or their electrical equivalent will be used in connection with the source of energy, the two instruments, and the bells illustrated. The instrument at the right is shown as a front elevation and the instrument at the left with the inclosing casing in vertical section and a portion of the interior mechanism in elevation. Fig. 2 is a front elevation of an instrument with the front dial removed. Fig. 3 is a vertical transverse section and side elevation. Fig. 4 is a front elevation of the oscillating contact-arm employed to give motion to the arm carrying the contact-pins. Fig. 5 is a front elevation of the arm which carries the contact-pins.

Similar numerals indicate like parts.

In the drawings, 10 represents the inclosing casing, which may be of wood, metal, rubber, or other suitable material, and 11 an order-transmitting handle mounted on the outer end of a bent arm 12, which is keyed fast to a shaft 13, carried in a hub-bearing 14, secured to or formed as a part of the casing 10. The front of the casing 10 is closed by a glass disk 15, over which is arranged a dial 16, in which are circular openings 17. The dial 16 has printed or otherwise formed upon it characters or words 18, Fig. 1, indicating any preferred code of signals—as, for instance, on the right-hand side "Ahead," "Slow," "Half," "Full;" at the center "Stop," and at the left "Astern," "Slow," "Half," "Full." The glass disk 15 and dial 16 are held in position on the casing 10 by the ring 19, which may be fastened by screws or other suitable means.

Located around the top of the casing and in position corresponding to the marking of the dial are the V-shaped slots 20, and located under the handle and in position to coöperate with these slots is a vertically-moving pointed pin 21, back of which is placed a spring 22. The object of this pin is to maintain the handle 11 in position when placed over any one of the slots 20. Projecting downward under the handle and over the face of the dial is a pointer 23.

Situated within the casing 10 and secured to the hub 14 is a disk of insulating material 24. Mounted along the upper periphery of this disk are four series of metal contacts 25 25ª 26 26ª. Each of these series is connected to a separate electrical conductor, as will hereinafter be described. Mounted upon the lower periphery of the disk is a metallic contact-sector 27. Mounted upon and rotatable on the hub 14 and in front of the disk 24 is an oscillating arm 28, normally held in any given position by means of a spring-disk 28ª. This arm is made of metal and carries at its upper end in insulating-bearings the spring-pressed contact-pins 29 30 and at its lower end in an insulating-bearing the contact-pin 31. The contact-pins 29, 30, and 31 respectively correspond to the contacts 25, 26, and 27 on the insulating-disk 24.

Mounted upon the inner end of the shaft 13 and rigidly secured to it is an oscillating contact-arm 32. The upper end of this arm has an opening 33 in it, within which the outer ends of the contact-pins 29 and 30 are located, and arranged opposite to the position normally occupied by such contact-pins are the inwardly-projecting studs 34 35. These studs serve a double purpose. For instance, when the handle 11 is rotated to the left the stud 34 impinges upon the end of the contact-pin 29 and also establishes an electrical connection between the stud 34 and the pin 29. Conversely, when the handle is turned to the right the stud 35 impinges upon the contact-pin 30 and establishes electrical connection between the stud and the pin. It will thus be seen that the contact-arm 32 actuates and makes contact with either the contact-pin 29 or 30 when the handle is moved and depending upon the direction of movement of the handle, but does not at any time make contact with both the contact-pins 29 and 30.

Arranged centrally of the casing 10 is a strip or plate 36, to which is secured brackets 37 38. On the bracket 37 are mounted two pairs of magnets 39 40, and on the bracket 38 are mounted two pairs of magnets 41 42. The magnets 39 40 are respectively in circuit with the contacts 25 25$^a$, while the magnets 41 and 42 are respectively in circuit with the contacts 26 26$^a$. It will be understood that when the handle is turned to the left of the instrument the magnets 39 and 40 will be alternately excited, and when turned to the right of the instrument the magnets 41 and 42 will be alternately excited.

Projecting from the plate 36 and toward the front of the instrument is a stud 43, on which is mounted so as to move freely a toothed wheel 44. Secured to the toothed wheel 44 and moving with it is an upwardly-projecting disk-arm 45, on the upper end of which is situated a disk 46, which is usually colored red or blue or other contrasting color to that of the dial.

Mounted in brackets 47 and 48 are the pivoted armatures 49 and 50. These armatures have secured to them so as to move with them the escapement-arms 51 and 52. It will be understood that when the magnets 39 and 40 are alternately energized the armature 49 will be oscillated, which will give motion to the escapement-arm 51, which taking in the toothed wheel 44 will rotate the wheel to the left and with it the arm 45, carrying the colored disk 46. Conversely, when the magnets 41 and 42 are alternately energized the armature 50 will be oscillated and the escapement-arm 52, which acting upon the toothed wheel 44 will rotate it to the right and with it the arm 45, carrying the colored disk 46.

53 represents a source of electrical energy; 54, call-bells located at the opposite stations; $a'$ $a^2$ $a^3$ $a^4$ $a^5$ $a^6$, one set of electrical conductors between the instruments. In practice duplicate sets of such conductors or their electrical equivalent in the shape of conductors are employed in connection with one source of electrical energy, one pair of instruments, and a call-bell at each station.

The operation of our device is as follows: Referring to Fig. 1, the instrument at the left may be assumed to be the instrument upon the bridge and that at the right the instrument in the engine-room; further, that before an order is given the handle 11 in the instrument at the left is in the position shown of the handle of the instrument at the right, and the officer on the bridge desires to transmit the signal "Slow astern" the handle 11 is grasped by the hand and moved to the left until the pointed pin 21 takes in the V-shaped slot 20 over the point marked "Slow" on the dial. The movement of the handle 11 to the left is transmitted through the oscillating contact-arm 32 and stud 34 to the contact-pin 29, mounted in the oscillating arm 28. This movement causes the pin 29 to move over the successive contacts 25 25$^a$—that is, to reach the position shown in Figs. 1 and 2 the contact 29 passes over two contacts 25 25$^a$. The first contact 25, it will be observed, is in circuit with the magnet 39, the circuit being from the source of electrical energy 53, wire $a^5$ to sector 27, contact-pin 31, wire $a^6$ to contact-arm 32, stud 34, pin 29, wire $a^3$, magnet 39, through magnet, wire $a^2$ to bell 54, back to source of energy. As the magnet 39 is excited it attracts one end of the armature 49, thereby moving the escapement-arm 51, which effects movement of the toothed wheel 44 to the left and with the wheel the disk-arm 45 of the engine-room instrument to the left. When the contact-pin 29 comes in contact with the contact 25$^a$, the circuit is through the magnet 40, which energizes the opposite end of the armature 49 and with it the escapement-arm 51, again moving the toothed wheel 44 and the disk-arm 45 to the left and to the position shown in the instrument at the right of Fig. 1—that is, so that the disk 46 is located under the opening marked "Slow" in the dial 16. The relative positions of the different parts of the two instruments at this time will be that shown in Fig. 1. The engineer now moves the handle 11 of the engine-room instrument to the left to mark "Slow," assuming similar circuits to exist between the engine-room instrument and the bridge instrument as has been described as existing between the bridge and engine-room instruments, when precisely the same series of movements take place in the instrument to the left of the figure, or, in other words, the instrument on the bridge has its disk-arm 45 moved to the "Slow" position and the officer on the bridge can see that the order has been executed.

It will be understood that by moving the handle to the left of either instrument the magnets marked 39 and 40 will be energized, and by moving the handle to the right the magnets marked 41 and 42 will be energized.

It will be observed that both instruments are open-circuit instruments and that when the handle is moved to any of the defined positions, as "Slow," "Half," "Full," the contact-pins 29 and 30 will not bear upon contacts 25 25ª 26 26ª, but will be located between successive pairs of contacts.

We have described in this specification a motor for moving the disk-arm consisting of a toothed wheel and escapement-arms energized by the alternate action of magnets. Manifestly other forms of motor may be employed for moving the disk-arm to the right or to the left, as desired.

Having thus described our invention, we claim—

1. In a signal-telegraph, a device for transmitting and receiving signals, comprising an oscillating handle, fixed contacts, an arm carrying contact-pins adapted to coact with said contacts, a contact device for imparting movement to the arm carrying the contact-pins, a series of electromagnets, a toothed wheel carrying a pointer, armatures carrying escapement-arms coacting with said toothed wheel and adapted to give movement to said toothed wheel in opposite directions as the magnets are energized, and a dial over which the pointer travels.

2. In a signal-telegraph, a device for transmitting signals comprising four series of spaced contacts, each series in circuit with an independent conductor, a contact-sector, an arm carrying a series of contact-pins adapted to coact with the spaced contacts and sector, and a contact-arm adapted to give movement to the contact-pins, and to coact with different contact-pins when rotated in opposite directions.

3. A signal-telegraph, comprising two identical instruments, each instrument provided with four series of spaced contacts, each series in circuit with an independent conductor and a magnet in the opposite instrument, a contact-sector in circuit with a source of energy and the magnets of the opposite instrument, an arm carrying a series of contact-pins adapted to coact with the spaced contacts and sector, a contact-arm adapted to give movement to the contact-pins, and to coact with different contact-pins when rotated in opposite directions, a motor device carrying a pointer adapted to be moved when the magnets are energized, and a marked scale.

4. In a signal-telegraph and in one instrument, a device for transmitting signals comprising an oscillating handle, fixed contacts, an arm carrying contact-pins adapted to coact with said contacts, a contact device for imparting movement to the arm carrying the contact-pins, and a device for indicating the signals received comprising a dial, a pointer, and electromagnetic means for imparting motion to the pointer.

5. In a signal-telegraph, the combination of an inclosing casing, an insulating-disk mounted therein carrying a series of spaced contacts, an oscillating handle, a loosely-mounted arm carrying contact-pins adapted to coact with said contacts, and a contact-arm connected to and actuated by said handle and adapted to coact with said arm carrying said contact-pins.

6. In a signal-telegraph, the combination of an insulating-disk carrying a series of spaced contacts, a freely-movable arm carrying a series of contact-pins, and a contact-arm for imparting movement to said arm carrying contact-pins, and provided with means for making contact with different contact-pins when the contact-arm is moved in opposite directions.

7. In a signal-telegraph, the combination of a freely-movable arm 28, carrying the contact-pins 29, 30 and 31, of a contact-arm 32, provided with the opening 33 and inwardly-projecting studs 34, 35.

8. In a signal-telegraph, the combination with the disk 24, carrying the spaced contacts 25ª, 26ª and sector 27, arm 28 carrying contact-pins 29, 30, 31, contact-arm 32, provided with the opening 33 and studs 34, 35.

In testimony whereof we affix our signatures in the presence of two witnesses.

ERWIN LAVENS.
EDWARD JOSEPH LAVENS.

Witnesses:
J. E. PEARSON,
J. A. CAVANAGH.